United States Patent Office 2,754,174
Patented July 10, 1956

2,754,174

TREATMENT OF SALT SOLUTIONS TO REMOVE IRON

Carlton E. Roberts, Johnstown, Pa., assignor to Bethlehem Steel Company, a corporation of Pennsylvania No Drawing. Application May 19, 1951,
Serial No. 227,279

8 Claims. (Cl. 23—125)

This application is a continuation-in-part of application Serial No. 37,522, filed July 8, 1948, now abandoned.

This invention relates to the treatment of metal salt solutions for the purpose of producing a readily filterable iron precipitate. More particularly, this invention is one in which metals in solution, such as zinc, nickel or copper, are treated with a phosphatic material and a base to produce iron in a readily filterable condition.

The principal object of this invention is to separate, in a rapid manner, iron from sulfate solutions of zinc, nickel or copper by filtration.

Another object is to retain the occluding power of an iron precipitate, which power is necessary to remove trace amounts of contaminants such as arsenic, antimony, etc.

A further object is to retain substantially all of the principle metal in solution after removal of the iron.

Still another object is to increase the permissible rate of the precipitation of ferric iron compound.

Hydrometallurgical solutions, and particularly zinc solutions such as those made from calcined zinc sulfide ore concentrate and sulfuric acid, for subsequent use as an electrolyte in plating or refining baths commonly contain small amounts of iron. Iron is introduced into the solution, as an impurity, from the zinc calcine, or it may be added deliberately. To obtain a satisfactory working solution of the principal metal, iron is removed after precipitation together with minor contaminants. These minor contaminants may be any one of the group including arsenic, antimony, selenium, tellurium, germanium, and tin, and are removed from the solution by adsorption, or occlusion, with the iron precipitate.

It has been the custom to remove iron from acid salt solutions by precipitation, precipitation being induced usually by the addition of a soluble oxide, hydroxide or carbonate of the principal metal to produce what is termed a neutral solution (pH from 3 to 6), whence ferric iron present in the solution precipitates as hydrous ferric oxide. Before precipitation, any ferrous iron present should be oxidized by addition to the leach solution of a suitable oxidizing agent, such as manganese dioxide.

In the hydrometallurgical treatment of a calcined zinc ore, for instance, iron precipitated for the first time, from concentrated zinc solutions, is usually in a nonfilterable or difficultly filterable state. It is thus necessary to dissolve the iron by the addition of sulfuric acid and re-form the iron precipitate. Iron precipitated under the above-mentioned conditions will carry with it most of the impurities, or contaminants, present in lesser amounts, such as arsenic, antimony, selenium, etc., if such ingredients are present in trace amounts. This second precipitate filters sufficiently well to permit of its clean separation from the solution, but while the rate of filtration of the second precipitate is considerably increased over that of the first, the filtration process is still a lengthy one.

In the formation of a neutral zinc sulfate electrolyte solution, formed by dissolving a calcined zinc ore with sulfuric acid, the method heretofore used can be conveniently expressed in more detail by the following four phases:

PHASE 1

The starting solution contains 180–200 g./l. of free sulfuric acid and 60–80 g./l. of zinc as zinc sulfate. Iron may be present as the sulfate in amounts up to 8 g./l. The temperature of the solution at this point ranges from 120° to 140° F. Zinc calcine is added to the solution to reduce the acid concentration to 10–20 g./l., or less at which point the temperature is increased to 205°–218° F. The iron concentration (from the iron impurity in the calcine and from the starting solution) in the solution now approaches very nearly the maximum, with the pH between about 0.05 and 1.2. The calcine is added rapidly in this phase. The time required per batch of 30 water volume-tons is about one hour.

PHASE 2

The remaining free acid, at the high iron point at the end of Phase 1, is neutralized, and iron is precipitated by adding calcine at a slow rate. This phase requires from 2 to 4 hours depending on the amount of iron in solution. All of the iron is precipitated in this phase (ferrous iron having been previously oxidized to ferric), and upon completion of the precipitation, the batch is said to be at the first neutral.

PHASE 3

The neutral solution from Phase 2 is re-acidified to a concentration of 10–20 g./l. of free acid by an addition either of 66° Bé. sulfuric acid, or acid of the same concentration as that of the starting solution. This acidification brings substantially all of the precipitated iron back into solution. The time required for this phase is about ½ hour.

PHASE 4

The solution is again neutralized by a slow addition of calcine as in Phase 2. The time required here is from 2 to 4 hours, the temperature remaining at about 205°–218° F. When all of the iron is re-precipitated, the solution is again neutral and is ready for filtration.

I have found that a phosphate such as orthophosphoric acid, calcium metaphosphate, or any soluble phosphate which in aqueous solution will produce $(PO_4)\equiv$ ions, when added to a solution containing zinc salts and undesirable iron, and in an amount less than the stoichiometric equivalent of the ferric iron in solution, will produce, under suitable conditions, and upon subsequent precipitation of the ferric iron with a base, a precipitate which will filter quite readily and which will retain the characteristic of a hydrous ferric oxide precipitate, i. e., that of removing substantially all of the minor contaminants such as antimony, arsenic, etc. The term "stoichiometric equivalent," as applied in this invention, refers to the gram molecular weight equivalent in relation to the normal ferric phosphate ($FePO_4$), or, Fe to $PO_4$ on a 1 mol to 1 mol basis.

By the use of my invention, introducing a soluble phosphate of the type described above, in an amount less than the stoichiometric equivalent of the iron in solution, to Phase 1 of a batch before or during the early addition of the neutralizing agent, an iron precipitate is formed in Phase 2 which is quite readily filterable. By being able to filter the slurry from Phase 2, the need for Phases 3 and 4 is obviated, thus reducing the time required for preparation of the filterable neutral slurry by as much as 40 per cent. Iron in the calcine is solubilized during the dissolving step and adds to the initial iron concentration present in Phase 1. The addition of the phosphate may be made at any point during Phase 1, prior to that at which the concentration of iron in solution is at a maximum, in other words prior to the point at which further addition of the neutralizing agent will precipitate iron. For practical operating conditions, phosphate should be added prior to the point at which the free acid in the solution is 10 g./l., or greater. After the phosphate has been added, some further addition of calcine is necessary to obtain a solution having a pH value at which the iron is precipitated. I have found that good results are obtained by addition of the phosphate prior to any calcine addition.

In the foregoing description, reference has been made to the use of an iron-bearing zinc calcine, such as that produced by calcining a zinc sulfide ore concentrate, for the purpose of neutralizing the free acid and precipitating iron. For the purposes of my invention it is not necessary that zinc calcine be used in the neutralizing step. There are many soluble bases which may be used. By soluble base, I mean any soluble oxide, hydroxide, carbonate or bicarbonate of the principal metals, i. e., zinc, nickel, or copper, or of sodium, potassium, calcium or magnesium, which is reactive with sulfuric acid solution.

When a phosphate which will produce $(PO_4)^\equiv$ ions is added to a leach solution in an amount less than the stoichiometric equivalent of the ferric iron present, it is believed that the iron precipitate produced by subsequent neutralization is in the form of a hydrous ferric oxide-phosphate complex, and it has been observed that the physical structure of this precipitate is altered so as to obtain greater filterability than is possible with a normal hydrous ferric oxide precipitate. The slimy, hard to filter, precipitate associated with the usual hydrous ferric oxide is characteristically absent in the phosphate complex precipitate and this hydrous ferric oxide-phosphate complex filters readily. This property of rapid filterability has been found to decrease the filtering time to approximately one-sixth, or less, of that formerly required. The benefit of rapid filtration is particularly significant where the iron (Fe) concentration is about 0.5 g./l. or more, and the concentration of the principal metal ion, zinc, nickel or copper is considerable. In solutions quite low in iron concentration, such as one containing 45 g./l. of zinc and 0.1 g./l. of ferric ion, the slurry, produced when iron is precipitated, has the inherent property of rapid filtration, so that the addition of a phosphate to this type of solution produces little or no benefit. For example, 400 ml. of this slurry will filter in 18 to 20 seconds, with or without the addition of a phosphate. On the other hand, 400 ml. of a slurry prepared from a zinc solution containing 200 g./l. of zinc and from 1.0 to 3.0 g./l. of iron would require 5 minutes or more to filter without the addition of phosphate. With the proper addition of phosphate to another portion of the same slurry, the filtration time is from 13 to 20 seconds. Similar results are obtainable with iron-containing solutions of metals other than zinc, such as nickel sulfate and copper sulfate solutions.

To illustrate the use of phosphates with nickel solutions, a slightly acid nickel sulfate solution containing 1.46 g./l. total iron (Fe) and 114 g./l. nickel (Ni) was treated with manganese dioxide to oxidize the iron to the ferric condition. The solution was separated into two equal portions, one portion being neutralized with sodium hydroxide to precipitate iron, and the other portion being treated with orthophosphoric acid, and then neutralized with sodium hydroxide to precipitate iron. In the portion in which phosphates were absent 400 ml. of the neutralized solution required 270 seconds to separate the precipitated hydrous ferric oxide precipitate from the solution by filtration, while 400 ml. of the phosphate treated slurry, in which the hydrous ferric oxide-phosphate complex precipitate was formed, required only 40 seconds to filter.

Tests were also made with a 400 ml. copper sulfate solution containing 75 g./l. copper and 1.5 g./l. ferric iron. Neutralization of the solution to the point of complete iron precipitation produced a hydrous ferric oxide precipitate which was separated from the solution by filtration in 180 seconds. When another 400 ml. portion of the same solution was treated with phosphate in the amount of 75% of the ferric iron equivalent, and neutralized to precipitate iron, the resultant hydrous ferric oxide-phosphate complex precipitate was separated from the solution by filtration in 25 seconds.

The precipitate of hydrous ferric oxide-phosphate complex, formed in my process, retains one favorable property of hydrous ferric oxide precipitate, in that it will carry with it trace amounts of contaminants which may be present in the leach solution. These contaminants, as previously stated, may consist of any one, or all, of the following: arsenic, antimony, selenium, tellurium, germanium and tin. In the well known method in which a basic material is added to the solution to precipitate iron as a hydrous ferric oxide, the iron will remove substantially all of the contaminants present by adsorption. I have found that when adding a phosphatic material, in an amount less than the stoichiometric equivalent of the ferric iron present, to a salt solution and neutralizing with a base to produce the precipitate of hydrous ferric oxide-phosphate complex, if the quantity of phosphatic material added is controlled within certain optimum limits, depending on the total amount of contaminants in solution, substantially all of the contaminants will be removed from solution by the hydrous ferric oxide-phosphate complex precipitate.

If there is insufficient iron present in the solution originally to remove minor contaminants, iron may be added to the solution in some form as will produce a hydrous oxide, such as addition of ferrous sulfate with subsequent oxidation, in an amount necessary to remove the contaminants. When iron is deliberately added, it may be treated with phosphate to improve filterability in the same manner as when iron is originally present in the solution.

The amount of phosphatic material, less than the stoichiometric equivalent of the ferric iron, necessary to be added to produce a precipitate having the property of removing the contaminants is a function of the total amount of contaminants present.

In the zinc plating industry, a useful means of determining whether contaminants in an electrolyte, are present in sufficient quantity so as to have a deleterious effect on plating, is by the method known as the ductility test. In this test, two liters of an electrolyte solution substantially free of iron, are used. The test solution should have a concentration of 80 g./l. of zinc and 220 g./l. of sulfuric acid. A test specimen is prepared by inserting in the electrolyte two platinum anodes, properly spaced from an aluminum cathode with shielded edges so as to permit of the same definite area exposed for each determination. The solution is electrolyzed for 20 minutes at a current density of 100 amp./sq. ft., and at a temperature of approximately 118° F. At the end of the run, the zinc plate formed on the cathode is rinsed with water, stripped from the cathode and trimmed and fitted to an Erichsen ball ductility tester. The ductility test results are recorded in one-thousandths of an inch, for example, 0.170 in. is recorded as 170. A result of 170 is considered passable for our present purpose. Ductilities of more or less than 170 may prove satisfactory for other than our present condition.

Ductility of the zinc plated is a measure of residual impurities and reflects the efficacy of hydrous iron oxide precipitates in removing small amounts of arsenic, antimony, tin, tellurium and the like.

To show the variable nature of the requirements for phosphate addition, the following examples of ductility tests made on zinc solutions are given:

TABLE I

| Batch No. | $Fe^{+++}$ in excess of $PO_4$ present g./l. | $Fe^{+++}$ equiv. to $PO_4$ present g./l. | $PO_4/Fe^{+++}$ equiv. percent | Filter time, min. | Ductility, in. |
|---|---|---|---|---|---|
| 1 | 0.235 | None | | 3.0 | 0.246. |
| 2 | 0.28 | 5.4 | 95 | 1.0 | 0.240. |
| 3 | 0.21 | 0.13 | 38 | 1.1 | 0.240. |
| 4 | 0.10 | 0.26 | 72 | 1.25 | 0.133. |
| 5 | none | 0.5 | 100+ | 1.25 | no metal. |

While in the above examples 0.21 g./l. iron (calculated as Fe in iron compound but uncombined with phosphate), or slightly higher, was ample to remove contaminants, the actual amount of iron uncombined with phosphate necessary for the treatment of any given solution will vary with the amount of contaminants in solution.

In zinc hydrometallurgy, as well as the hydrometallurgy of the other non-ferrous metals, the amounts of minor contaminants are not generally determined by specific analytical tests, hence the use of the ductility tests on electrolyte solutions made from ore leaches. Available test data have shown that tellurium cannot be tolerated in zinc electrolytes wherein tellurium concentration is above an amount of from 0.00001 to 0.00003 gram per liter without loss in electrochemical efficiency. Likewise, for germanium the tolerance is from 0.0001 to 0.0004 g./l., while for antimony it is from 0.0001 to 0.0007 g./l. Selenium, arsenic and tin may be said to have comparable tolerances, above which they adversely affect the plating of zinc. Each of the contaminants mentioned here, if present, will be co-precipitated with the iron-phosphate complex precipitate, when the complex is formed by adding to the leach solution a phosphatic material in some optimum amount less than the stoichiometric equivalent of the ferric iron in solution in the leach. The amount of phosphatic material that may be added so that impurities will be removed can be determined by the ductility test on the purified solution from any given zinc ore. Tolerance of the poisons present will vary somewhat as plating conditions vary.

In treating nickel or copper solutions the same practice should be adhered to for the removal of contaminants as that outlined for zinc.

In order to further show the relationship of phosphate addition to filter rate, as well as the influence of zinc and iron-concentration on the rate, the following examples are listed:

TABLE II

Zinc sulfate-ferric sulfate-sulfuric acid-water system in which zinc oxide is added to precipitate the iron at a pH of approximately 3.2

| Zinc (Zn.), g./l. | Iron ($Fe^{+++}$), g./l. | $PO_4/Fe^{+++}$ ratio, percent | Filter time, Seconds |
|---|---|---|---|
| 5 | 1.5 | none | 15 |
| 25 | 2.0 | none | 20 |
| 25 | 5.0 | none | 61–97 |
| 50 | 5.0 | none | 123 |
| 150 | 2.0 | none | 200 |
| 200 | 0.25 | none | 60 |
| 200 | 0.50 | none | 360–480 |
| 200 | 1.0 | none | over 900 |
| 200 | 2.0 | none | over 900 |
| 200 | 0.5 | 50 | 90 |
| 200 | 1.0 | 50 | 150–180 |
| 200 | 2.0 | 50 | 120–150 |
| 200 | 1.0 | 75 | 50 |
| 200 | 2.0 | 75 | 60–75 |

The values given in Tables I and II for filter time, represent the elapsed time required to filter 400 ml. of the neutral slurry through an 18.5 cm. diam. #4 Whatman filter paper on an 18.5 cm. diam. Büchner funnel at approximately 29" of vacuum.

For a zinc solution, such as the system indicated above, the examples clearly show the need for phosphate addition as the zinc and/or iron concentration approaches a certain value. These data also show that for concentrations above those at which difficultly filterable iron precipitates are formed when no phosphate is added, uniformly satisfactory results are obtained upon the addition of phosphate. While in the examples given above, the amount of phosphate added was either 50% or 75% of the stoichiometric equivalent of the ferric iron in solution, it may be stated that the amount of phosphate needed to produce an increased filtration rate is a function of the solution concentration, and in some cases phosphate to iron ratio may be as low as 20% to 25%, or as high as 95%. The best operating range for phosphate addition has been found to be 30% to 80% in most cases; however, tests should be made on any given solution to determine in what amount phosphate will be effective as an aid to filtration.

It should be borne in mind that my invention results in both rapid filtration of the iron precipitate and in the removal of minor contaminants from the solution, and that both results are dependent on solution concentration. To this end it will be necessary, when practicing my invention, to determine the concentration of the principal metal (zinc, nickel or copper), ferric iron, and the minor contaminants, so that the proper amount of phosphatic material will be added. The minor contaminants will probably best be determined by the ductility test, or some similar method.

The iron-phosphate complex precipitate will be formed at a pH of less than 3.5. As zinc will precipitate in a concentrated zinc solution at a pH of approximately 4.3, by controlling the pH less than 3.5 all of the iron precipitates, and substantially all of the zinc remains in solution. The iron precipitate can be separated from the zinc solution by any conventional means, such as filtration, and results in practically complete separation. The fact that the iron impurity can be removed from the solution rapidly, with practically no loss of zinc, except that which may be held mechanically by the iron precipitate, is an important factor in the economics of the process.

While lowering of the temperature will cause precipitation of the iron at lower pH values, phosphates can be used successfully with zinc solutions at any temperature between room temperature and the boiling point of the solution. As the $(PO_4)^\equiv$ ion concentration is increased in a zinc solution, the pH value at which iron precipitates will be of slightly decreasing order.

Some care should be exercised in making the final addition of calcine just prior to, and during, precipitation of the iron. At this stage (Phase 2) in the process the neutralizing material should be added rather slowly in order to produce the desired readily filterable precipitate. However, the rate of addition, in the presence of phosphate, may be increased by from two to eight times during Phase 2, over that of prior methods. The permissible rate at which calcine (neutralizing material) may be added in the final neutralizing step is governed by the phosphate/ferric iron ratio, the solution concentration and the solution temperature, among other factors.

I claim:

1. The method of treating an acid sulfate solution of a metal of the group consisting of zinc, nickel and copper containing ferric iron as impurity and at least one minor contaminant, in which the iron is present in an amount substantially not less than 0.5 gram per liter so that upon subsequent precipitation of the iron as a ferric iron compound the filter rate of the sulfate solution will be increased, which comprises as a first step adding to said solution a soluble base and a phosphatic compound which supplies $(PO_4)^\equiv$ ions, said phosphatic compound being added prior to the point at which any additional base will begin to precipitate the ferric iron, the amount of such addition of said phosphatic compound being less than the stoichiometric equivalent (as FePO₄) of the ferric iron in solution and then adding an additional quantity of base in a second step sufficient to precipitate substantially all of the ferric iron in solution.

2. The method of treating an acid sulfate solution of zinc containing ferric iron as impurity and at least one minor contaminant, in which the iron is present in an amount substantially not less than 0.5 gram per liter so that upon subsequent precipitation of the iron as a ferric iron compound the filter rate of the sulfate solution will be increased, which comprises as a first step adding to said solution a soluble base and a phosphatic compound which supplies (PO₄)≡ions, said phosphatic compound being added prior to the point at which any additional base will begin to precipitate the ferric iron, the amount of such addition of said phosphatic compound being less than the stoichiometric equivalent (as FePO₄) of the ferric iron in solution and then adding an additional quantity of base in a second step sufficient to precipitate substantially all of the ferric iron in solution.

3. The method of treating a zinc sulfate solution containing ferric iron as impurity and at least one minor contaminant, in which the iron is present in an amount substantially not less than 0.5 gram per liter so that upon subsequent precipitation of the iron as a ferric iron compound the filter rate of the sulfate solution will be increased, which comprises as a first step adding to said solution a soluble base and a phosphatic compound which supplies (PO₄)≡ions, said phosphatic compound being added prior to the point at which any additional base will begin to precipitate the ferric iron, the amount of such addition of said phosphatic compound being from 20 per cent to 95 per cent of the stoichiometric equivalent (as FePO₄) of the ferric iron in solution and then adding an additional quantity of base in a second step sufficient to precipitate substantially all of the ferric iron in solution.

4. The method of treating a zinc sulfate solution containing ferric iron as impurity and at least one minor contaminant, in which the iron is present in an amount substantially not less than 0.5 gram per liter so that upon subsequent precipitation of the iron as a ferric iron compound, the filter rate of the sulfate solution will be increased, which comprises as a first step adding to said solution a soluble base and a phosphatic compound which supplies (PO₄)≡ions, said phosphatic compound being added at any point wherein the amount of free acid in the solution is 10 grams per liter or greater, the amount of such addition of said phosphatic compound being from 30 per cent to 90 per cent of the stoichiometric equivalent (as FePO₄) of the ferric iron in solution and then adding an additional quantity of base in a second step sufficient to precipitate substantially all of the ferric iron in solution.

5. The method of treating a zinc sulfate solution containing ferric iron as impurity and at least one minor contaminant in which zinc is present in an amount not less than 200 grams per liter and iron is present in an amount not less than 0.5 gram per liter, which comprises as a first step adding to said solution a soluble base and a phosphatic compound which supplies (PO₄)≡ ions, said phosphatic compound being added at any point wherein the amount of free acid in the solution is not less than 10 grams per liter, the amount of such addition of said phosphatic compound being less than the stoichiometric equivalent (as FePO₄) of the ferric iron in solution and then adding an additional quantity of base in a second step sufficient to precipitate substantially all of the ferric iron in solution.

6. The method of treating a zinc sulfate solution containing ferric iron as impurity and at least one minor contaminant in which zinc is present in an amount not less than 200 grams per liter and iron is present in an amount not less than 0.5 gram per liter, which comprises as a first step adding to said solution a soluble base and a phosphatic compound being added at any point wherein the amount of free acid in the solution is not less than 10 grams per liter, the amount of such addition of said phosphatic compound being from 30 per cent to 90 per cent of the stoichiometric equivalent (as FePO₄) of the ferric iron in solution and then adding an additional quantity of base in a second step sufficient to precipitate substantially all of the ferric iron in solution.

7. The method of treating an acid solution of a non-ferrous metal sulfate containing ferric iron as impurity and at least one minor contaminant in which the iron is present in an amount substantially not less than 0.5 gram per liter so that upon subsequent precipitation of the iron as a ferric iron compound the filter rate of the sulfate solution will be increased, which comprises as a first step adding to said solution a soluble base and a phosphatic compound which supplies (PO₄)≡ ions, said phosphatic compound being added prior to the point at which any additional base will begin to precipitate the ferric iron, the amount of such addition of said phosphatic compound being less than the stoichiometric equivalent (as FePO₄) of the ferric iron in solution and then adding an additional quantity of base in a second step sufficient to precipitate substantially all of the ferric iron in solution, forming a precipitate containing said ferric iron and removing substantially completely said contaminant from solution.

8. The method of treating an acid sulfate solution of a metal of the group consisting of zinc, nickel and copper containing ferric iron as impurity and at least one minor contaminant in which the iron is present in an amount substantially not less than 0.5 gram per liter so that upon subsequent precipitation of the iron as a ferric iron compound the filter rate of the sulfate solution will be increased, which comprises as a first step adding to said solution a soluble base and a phosphatic compound which supplies (PO₄)≡ ions, said phosphatic compound being added prior to the point at which any additional base will begin to precipitate the ferric iron, the amount of such addition of said phosphatic compound being less than the stoichiometric equivalent (as FePO₄) of the ferric iron in solution and then adding an additional quantity of base in a second step sufficient to precipitate substantially all of the ferric iron in solution, forming a precipitate containing said ferric iron and concomitantly removing said contaminant substantially completely from the solution by said precipitate.

References Cited in the file of this patent

UNITED STATES PATENTS

| | | |
|---|---|---|
| 956,763 | Gates | May 3, 1910 |
| 1,496,004 | Laist | June 3, 1924 |
| 2,038,078 | Hardick | Apr. 21, 1936 |
| 2,168,985 | Gulbrandsen | Aug. 8, 1939 |
| 2,206,889 | Gulbrandsen | July 9, 1940 |
| 2,369,270 | Wadell | Feb. 13, 1945 |
| 2,390,272 | Riesmeyer | Dec. 4, 1945 |
| 2,416,508 | Barnes | Feb. 25, 1947 |
| 2,542,743 | Weymouth | Feb. 20, 1951 |

FOREIGN PATENTS

| | | |
|---|---|---|
| 6,337 | Great Britain | 1907 |

OTHER REFERENCES

Mellor: "Treatise on Inorganic and Theoretical Chemistry," vol. 13, pages 870–871; vol. 14, pages 402–403, Longmans, Green and Co., N. Y., 1935.